United States Patent [19]

Cimperman

[11] Patent Number: 4,871,568
[45] Date of Patent: Oct. 3, 1989

[54] METHOD FOR PITTING OLIVES

[75] Inventor: Fred J. Cimperman, Castro Valley, Calif.

[73] Assignee: Ashlock Company, San Leandro, Calif.

[21] Appl. No.: 172,308

[22] Filed: Mar. 23, 1988

[51] Int. Cl.$^4$ .............................................. A23N 4/08
[52] U.S. Cl. ...................................... 426/484; 99/555; 426/485
[58] Field of Search ...................... 426/484, 485, 481; 99/549, 554, 555

[56]  References Cited

U.S. PATENT DOCUMENTS

| | | | |
|---|---|---|---|
| 2,205,397 | 6/1940 | Drake | 99/490 |
| 2,924,259 | 2/1960 | Magnuson | 426/485 |
| 4,096,795 | 6/1978 | Del Ser Gonzalez | 99/494 |
| 4,290,350 | 9/1981 | Del Ser Gonzalez | 99/494 |
| 4,308,292 | 12/1981 | Silvestrini | 426/485 |
| 4,388,858 | 6/1983 | Margaroli et al. | 99/494 |
| 4,644,859 | 2/1987 | Gutierrez Rubio et al. | 99/494 |

Primary Examiner—George Yeung
Attorney, Agent, or Firm—Limbach, Limbach & Sutton

[57] ABSTRACT

A method and apparatus for pitting olives, in which each olive is held between a pair of matching knives as the knives are rotated along parallel circular paths by a rotating drive shaft. The knives may both be coring knives or may both be pitting knives, and are aligned so that their longitudinal axes coincide and the common longitudinal axis is substantially perpendicular to the plane of the olive's circular path. As the knives rotate along parallel circular paths, they are translated by cams along their common longitudinal axis so as to penetrate opposite ends of the olive simultaneously and then to push the pit out through one end of the olive. The coring knife embodiment of the invention leaves a clean bore through the pitted olive after removal of the core (including the pit), and prevents the pit from tearing away an irregularly shaped olive portion during removal. The pitting knife embodiment of the invention, on the other hand, maximizes the weight of the pitted olive product by employing cross-shaped pitting knives to make incisions in the olive ends which define flaps. The flaps at one end of the olive are displaced as the pit is pushed out through that end. The flaps then close after the pit has been removed.

4 Claims, 2 Drawing Sheets

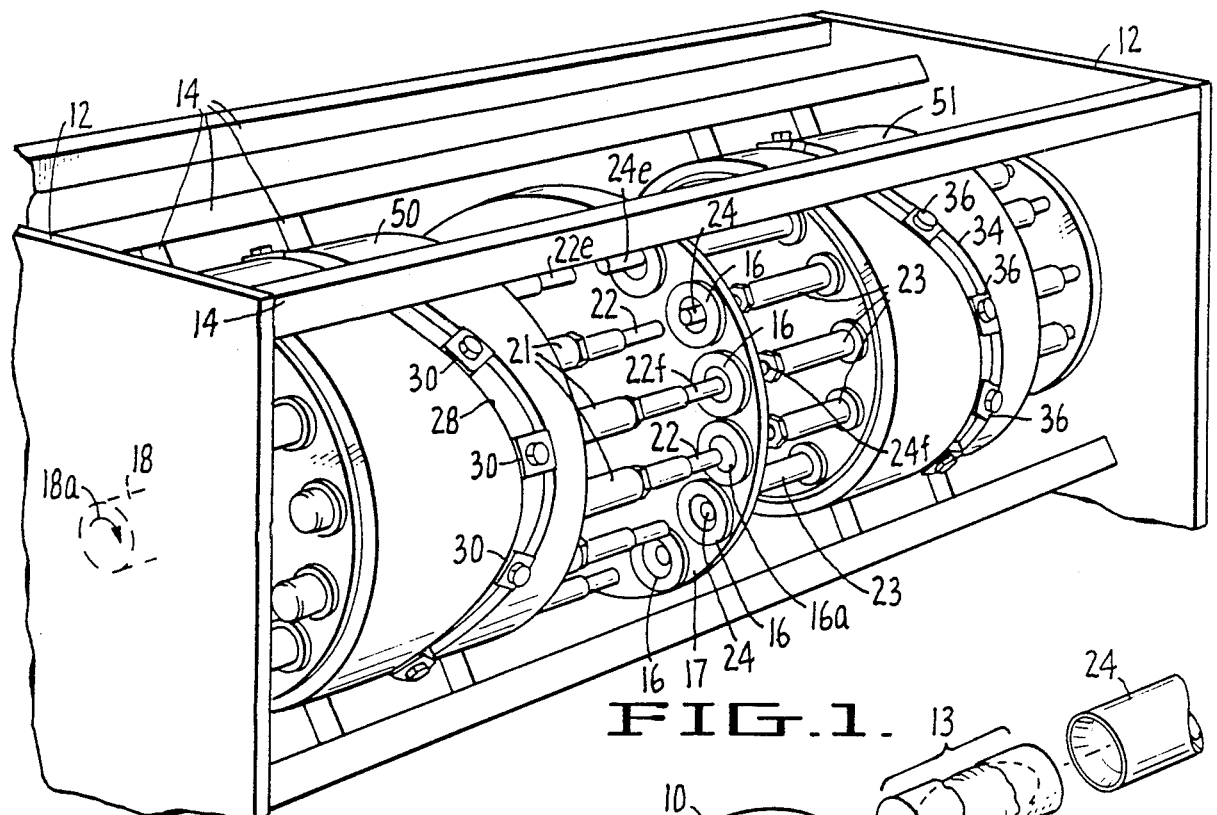
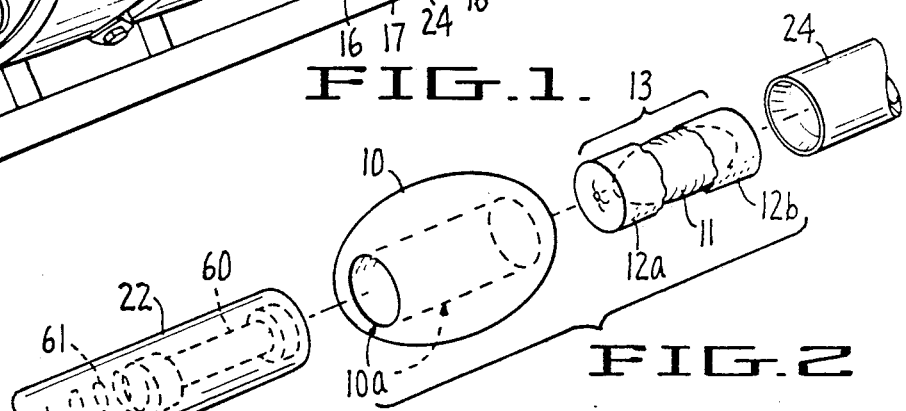
FIG.1.
FIG.2.
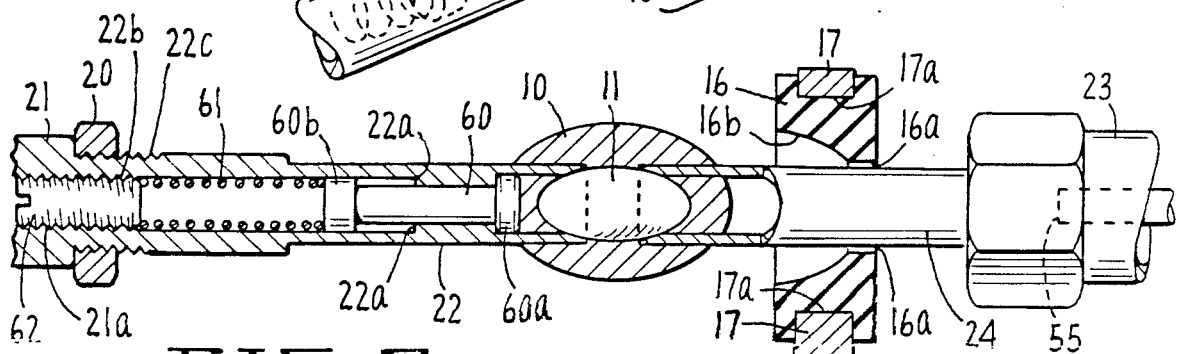
FIG.3.
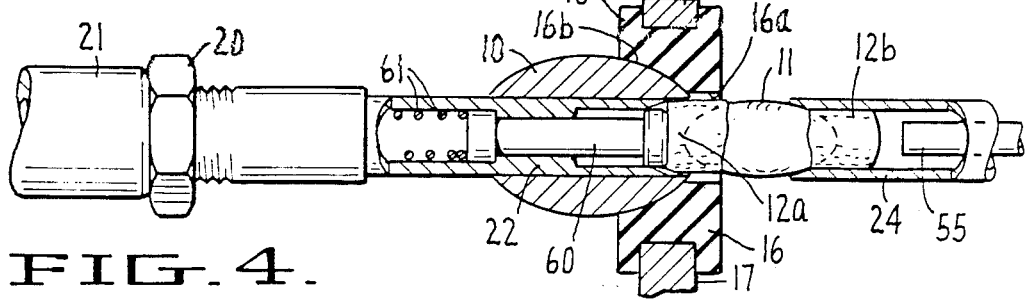
FIG.4.

4,871,568

METHOD FOR PITTING OLIVES

FIELD OF THE INVENTION

The invention relates to methods and apparatus for pitting olives. More particularly, the invention is a method and apparatus employing a pair of coring knives (or a pair of pitting knives) to penetrate both ends of an olive simultaneously and then to remove the olive pit by pushing the pit through one end of the olive.

BACKGROUND OF THE INVENTION

Conventional olive pitting machines employ a cam-driven pitting knife and a coaxially mounted, opposed, cam-driven coring knife to remove a pit from an olive. Typically, the pitting knife has a cross-shaped profile (such as the profile of knife 72 or 74 in FIG. 6), and the coring knife has a circular profile (such as the profile of knife 22 or 24 in FIG. 2). Each olive is held during the pitting operation in a position so that the olives's longitudinal axis coincides with the axis of the opposed pitting and coring knives. The coring and pitting knives simultaneously penetrate opposite ends of the olive. Then, the coring knife retracts, and the pitting knife pushes the pit out from within the olive through the cylindrical passage produced by the coring knife.

One problem with this type of conventional pitting machine is that, as the pitting knife pushes the pit toward the retracting coring knife, the olive portion clinging to the pit often tears away at the pitting knife entry point. This "tear-out" phenomenon occurs especially frequently when olives of the "cling-stone" variety are being pitted. The tear-out phenomenon detracts from the appearance of the torn pitted olives, and reduces their value.

When cling-free olives (which do not frequently tear at the pitting knife entry point) are processed with the conventional pitting machine described above, another disadvantage of such conventional machine is that the coring knife removes a substantial portion of the olive flesh. Thus, the pitted olives produced by this type of machine have a lower average weight than they would have if the coring knife would remove less flesh from the olive.

It has not been known until the present invention how to eliminate both the "tear out" problem and the reduced yield problem, which are inherent in operation of conventional olive pitting machines.

SUMMARY OF THE INVENTION

The invention is a method and apparatus for pitting olives. In a preferred embodiment of the inventive apparatus, each olive is positioned between a pair of matching knives (i.e., a pair of coring knives, or a pair of pitting knives) as the knives are rotated along a circular path by a rotating drive shaft. The knives are aligned so that their longitudinal axes coincide and the common longitudinal axis is substantially perpendicular to the plane of the olive's circular path. As the knives rotate along circular paths parallel to the olive's path, they are translated by cams along their common longitudinal axis so as to penetrate opposite ends of the olive simultaneously and then to push the pit out through one end of the olive. After the pitting operation, the pitted olive continues to rotate along the circular path while both the knives are retracted out of engagement therewith, thus allowing the pitted olive to fall away from the inventive apparatus.

The coring knife embodiment of the invention leaves a clean bore through the pitted olive after removal of the core, and prevents the pit from tearing away an irregularly shaped olive portion during removal. By simultaneously and cleanly coring both ends of the olive before the pit is pushed out through one end, the invention allows a cleanly severed core (consisting of the pit and the portion of the olive flesh adjacent the pit and within the core volume defined by the coring knives) to be pushed out through one cored end of the olive by one of the coring knives. The severed pit will not cling to the olive portion outside the core volume defined by the coring knives.

The pitting knife embodiment of the invention, on the other hand, maximizes the weight of the pitted olive product in the following manner. The pitting knives do not sever and remove end portions of the olive (as do the coring knives in the coring knife embodiment of the invention). Instead, the pitting knives make incisions (which typically are cross-shaped or star-shaped) in the olive ends which define flaps. The flaps at one end of the olive are displaced as the pit is pushed out through that end. The flaps then close after the pit has been removed. Thus, the pitting knife embodiment avoids removal of the olive end portions, which end portions are severed (and subsequently discarded) with the olive pit in the coring knife embodiment.

BRIEF DESCRIPTION OF THE DRAWINGS

FIG. 1 is a perspective view of an apparatus embodying a first preferred embodiment of the invention employing pairs of opposed coring knives.

FIG. 2 is a perspective view of a pitted olive that has been processed by the apparatus shown in FIG. 1, and of the inner core severed from that pitted olive.

FIG. 3 is a side view, partially elevational and partially cross-sectional, of a portion of the FIG. 1 apparatus, including a pair of coring knives, and an olive held between the coring knives.

FIG. 4 is a side view, partially elevational and partially cross-sectional, of the FIG. 3 apparatus, at a later moment during the pitting operation cycle.

DETAILED DESCRIPTION OF THE PREFERRED EMBODIMENTS

Figure 5:
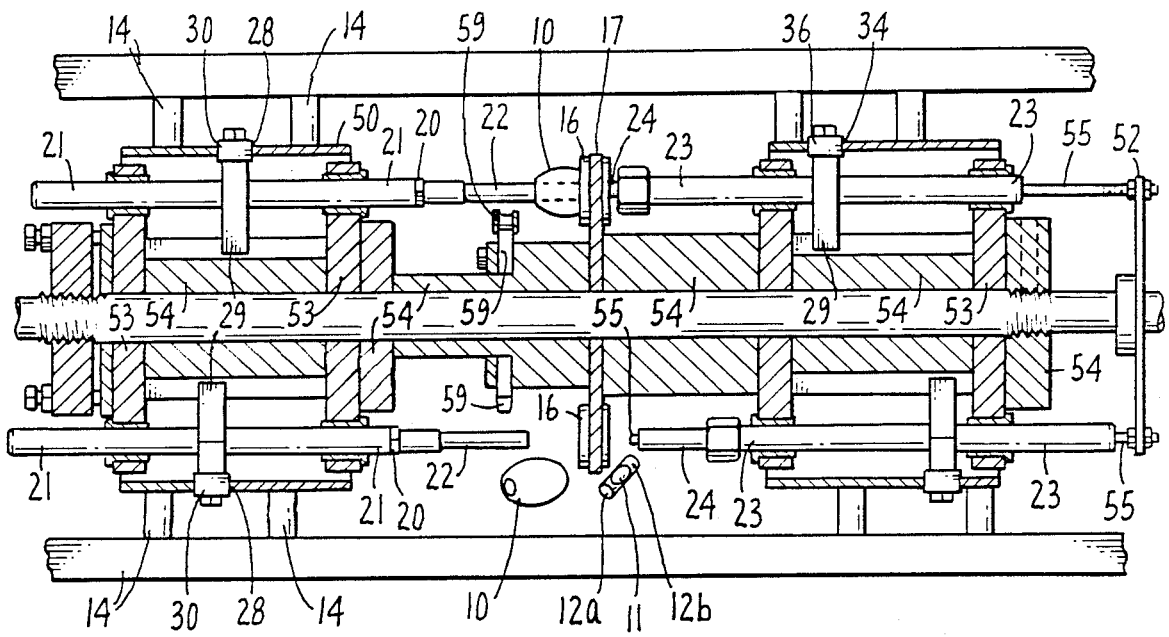
FIG. 5 is a cross-sectional view of a portion of the FIG. 1 apparatus.

The overall arrangement of a preferred embodiment of the inventive apparatus will be described with reference to FIG. 1. Drive shaft 18 is fixedly attached to plate 17 through the center of plate 17. Shaft 18 rotates clockwise, in the direction indicated by arrow 18a. When a drive means (not shown) rotates shaft 18, pockets 16 in plate 17 are translated along a circular path in a plane perpendicular to the longitudinal axis of shaft 18. It is contemplated that the inventive apparatus may include any number of pockets 16. A pair of opposed coring knives 22 and 24 is provided for each pocket 16. An olive (shown in FIGS. 2 through 5, but not in FIG. 1) may be held between each pair of knives 22 and 24. Each pair of knives 22, 24 (and any olive held between knives 22 and 24) is translated along a circular path parallel to the path of the associated one of pockets 16 as shaft 18 rotates. During a portion of the processing cycle, any olive held between a pair of coring knives is pressed against one of pockets 16 by coring knife 22, while coring knife 24 retracts away from coring knife 22 through orifice 16a of pocket 16.

Each of plunger shafts 21 and 23 is fixedly attached to a pair of members 53 (shown in FIG. 5). Members 53 are in turn fixedly attached to shaft 18. A coring knife 22 is attached to the end of each of shafts 21 (coring knives 22e and 22f are identical to the other coring knives 22). A coring knife 24 is attached to the end of each of shafts 23 (coring knives 24e and 24f are identical to the other coring knives 24). Coring knives 22 are identical to coring knives 24, except that only knives 22 (not knives 24) have an assembly including an eject pin 60 mounted therewithin. Plate 17 and members 53 are oriented so that each pocket 16 is positioned to receive one of knives 24, and so that each of knives 22 is aligned colinearly with an opposing one of knives 24. As shaft 18 rotates, plate 17 and members 53 rotate as a unit with shaft 18 so that each pocket 16, and the knives 22 and 24 aligned with the pocket, traverse parallel circular paths.

As shaft 18 rotates, and the members (such as members 53 and plate 17) fixedly attached to shaft 18 rotate as a unit with shaft 18, rigid frame members 14 and end plates 12 remain stationary. Cylinder 50 and cylinder 51 are fixedly attached to frame members 14, so that they also remain stationary as shaft 18 rotates. Cam track 28 is defined in the side wall of cylinder 50. Cam track 34 is defined in the side wall of cylinder 51. As shaft 18 rotates, cam followers 30 ride in track 28 and cam followers 36 ride in track 24. A member 29 is connected between each cam follower and each of plunger shafts 21 and 23. Thus, when shaft 18 rotates, cam followers 30 and 36, members 29, and shafts 21 and 23 move parallel to the longitudinal axis of shaft 18.

A conventional loading means (not shown) may be employed for loading olives between pairs of opposed knives 22 and 24.

FIG. 2 is a perspective view of pitted olive 10 that has been pitted by the FIG. 1 apparatus. Inner core 13, which includes olive pit 11 and olive end portions 12a and 12b, has been severed and removed from pitted olive 10 by the FIG. 1 apparatus. Coring knife 22 has severed end portion 12a from pitted olive 10, and coring knife 24 has severed end portion 12b from pitted olive 10. Eject pin 60 within knife 22 has pushed core 13 through one end of olive 10. Coring knives 22 and 24 have thus defined a clean, cylindrical inner bore 10a through pitted olive 10.

FIG. 3 is a cross-sectional view of a portion of the FIG. 1 apparatus, including a pair of opposed coring knives 22 and 24, and an olive 10 (with pit 11) held between the coring knives. FIG. 3 represents an early stage in the pitting cycle, in which knives 22 and 24 have been urged together by cam followers 30 and 36, respectively, so as to have penetrated both ends of olive 10 simultaneously. The position of knives 22 and 24 in FIG. 3 corresponds to the position of the uppermost pair of knives (knives 22e and 24e) in FIG. 1.

Pocket 16 is fixedly attached to plate 17 within orifice 17a in plate 17. Pocket 16 has a curved surface 16b which is sized and shaped to receive an olive, although in FIG. 3, olive 10 has not yet been pushed into engagement with surface 16b. Pocket 16 is generally ring-shaped, and has a central axis of symmetry aligned colinearly with the common longitudinal axis of opposed knives 22 and 24. Pocket 16 also has an inner cylindrical surface 16a which defines an orifice dimensioned and oriented to receive coring knife 24 as coring knife 24 advances and retracts parallel to its longitudinal axis. Preferably, pocket 16 is formed of a resilient material such as rubber. An advantage of forming pocket 16 of resilient material is that pocket 16 will then be capable of temporarily deforming to admit an unusually large olive pit, or an olive pit that is misoriented with its longitudinal axis perpendicular to the longitudinal axis of knives 22 and 24.

Coring knife spring 61 and eject pin 60 are mounted within coring knife 22. Pin 60 has an outer end portion 60a and inner end portion 60b. Knife 22 is assembled as follows: spring 61 is inserted within the central bore of knife 22, then set screw 62 is screwed into internal threaded portion 22b of knife 22, then jam nut 20 is screwed onto the outer threaded portion 22c of knife 22, and then the outer threaded portion of screw 62 is screwed into threaded end portion 21a of plunger shaft 21. Of course, alternative means may be employed for attaching knife 22 to plunger shaft 21 and retaining spring 61 within the volume bounded by knife 22, pin 60, and plunger shaft 21.

When spring 61 is fully extended, inner end portion 60b engages with shoulder 22a of knife 22, so that pin 60 is retained within knife 22. In FIG. 3, spring 61 has been slightly compressed between pit 11 and set screw 62.

FIG. 4 shows the same pair of knives 22 and 24 shown in FIG. 3, but shows the position of these knives at a later moment during the pitting operation. Knives 22 and 24 of FIG. 4 have the same position relative to plate 17 as do knives 22f and 24f in FIG. 1. It should be appreciated that each pair of knives 22 and 24 in the FIG. 1 apparatus will successively occupy each angular position about shaft 18, including the angular position of knives 22e and 24e, and the angular position of knives 22f and 24f. Each pair of knives will have the same configuration (i.e., distance relative to plate 17) when occupying the same angular position relative to shaft 18, although the configuration of each such pair of knives will change as each such pair translates along its generally circular path about shaft 18.

In FIG. 4, the assembly including plunger shaft 21, knife 22, and eject pin 60 has pushed olive 10 toward the right into engagement with surface 16b of pocket 16. Simultaneously, knife 24 has retracted to the right through orifice 16a of pocket 16. Spring 61 and eject pin 60 are pushing the olive core (which comprises pit 11 and olive end portions 12a and 12b) relative to fixed olive 10 through orifice 16b. As the assembly including shaft 21, knife 22, and eject pin 60 continues to advance to the right and knife 24 continues to retract to the right, the olive core will be stripped from the end portion of knife 24 by ejector rod 55, which is disposed within knife 24 and plunger shaft 23. Ejector rod 55 remains fixed relative to plate 17 as knife 24 retracts to the right.

FIG. 5 is a cross-sectional side view of the FIG. 1 apparatus. The upper plunger shaft 23 in FIG. 5 has been driven by the associated cam follower 36 and member 29 connected thereto into a position fully extended to the left. The upper plunger shaft 21 in FIG. 5 has been driven by the associated cam follower 30 and member 29 connected thereto into a position partially extended to the right. Thus, both ends of the upper olive 10 in FIG. 5 have been simultaneously penetrated by upper coring knife 22 and upper coring knife 24, and the upper olive has been translated into contact with upper pocket 16.

Conveyor 59 is translated around a circular path by member 59, which rotates as a unit with shaft 18. A conventional loading means (not shown) deposits olives on conveyor 59. Conveyor 59 supports each olive until the olive is gripped and penetrated by a pair of opposing knives 22 and 24. Conveyor 59 is shown in a position displaced to the left from plate 17 and upper olive 10. Thus, it will be appreciated that the tips of upper knives 22 and 24 must have spanned conveyor 59 at the moment when they first engaged upper olive 10, and that to have reached the position shown in FIG. 5, upper knives 22 and 24 both have been translated to the right with respect to conveyor 59 since the time they first engaged upper olive 10.

The lower plunger shaft 23 in FIG. 5 has been driven by the associated cam follower 36 and member 29 connected thereto into a position fully retracted to the right. The lower plunger shaft 21 in FIG. 5 has been driven by the associated cam follower 30 and member 29 connected thereto into a position retracted to the left. Thus, the lower coring knife 24 has been retracted to allow lower ejector rod 55 to strip the olive core (including pit 11 and olive end portions 12a and 12b) from lower knife 24, and the lower coring knife 22 has been retracted to allow lower pitted olive 10 to fall away from lower pocket 16.

Rotating members 53 rotate plunger shafts 21 and 23 through a cylindrical region surrounding shaft 18. As shafts 23 rotate, they translate to the left and to the right as cam followers 36 ride in cam track 34. As shafts 21 rotate about shaft 18, they translate to the right and to the left as cam followers 30 ride in cam track 28.

Each of ejector rods 55 is slidably positioned inside of one of plunger shafts 23 and is rigidly attached to member 52. As shaft 18 rotates, it causes member 52 to rotate relative to stationary frame members 14. The relative movement between plungers 23 and ejector rods 55 strips the olive core from coring knife 24 as plunger 23 is retracted.

As shaft 18 is rotated by a conventional drive means (not shown), plate 17, and members 52, 53, and 54 rotate as a unit with shaft 18. However, frame members 14 and cylindrical members 50 and 51 (and end plates 12 shown in FIG. 1), remain stationary.

In the preferred embodiment of FIGS. 1 through 5, coring knives 22 and 24 are hollow and cylindrical. In variations on this embodiment, knives 22 and 24 may have other "hollow" shapes (which define an interior core area), with the constraint that the cross-sections of the knives in each pair of opposing knives match each other.

Figure 6:
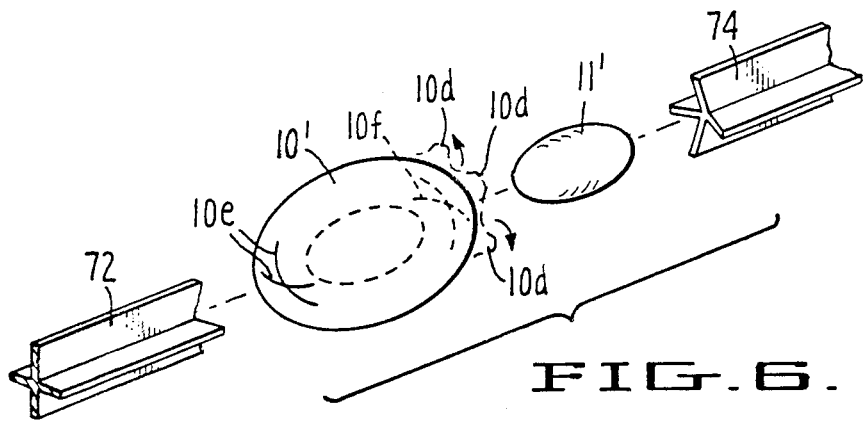
FIG. 6 is a perspective view of a pitted olive that has been processed by a second preferred embodiment of the inventive apparatus, which employs a pair of opposed pitting knives. The pit that has been removed from the pitted olive is also shown.
Figure 7:
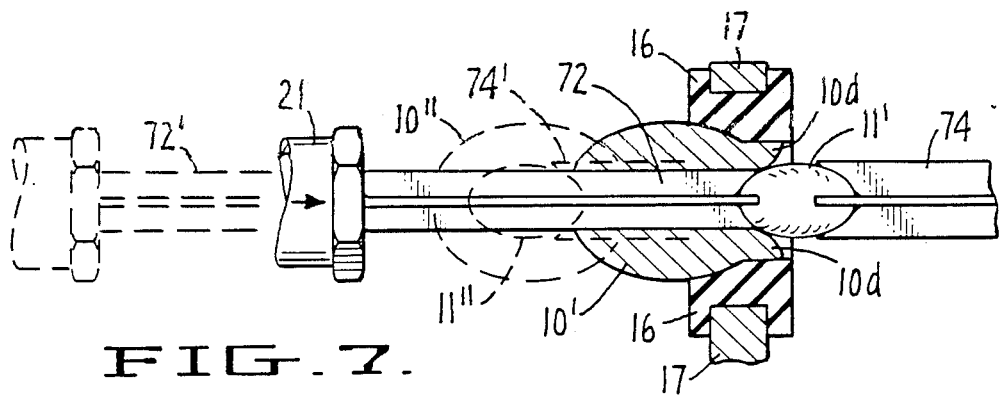
FIG. 7 is a side view, partially elevational and partially cross-sectional, of a portion of a second preferred embodiment of the inventive apparatus which employs pairs of opposed pitting knives.

A second preferred embodiment of the invention will next be described with reference to FIGS. 6 and 7. The embodiment of FIGS. 6 and 7 is identical to the FIGS. 1-5 embodiment, except that each pair of opposed hollow coring knives 22 and 24 is replaced by a pair of opposed pitting knives 72 and 74. The knives in each pair 72, 74 of opposed pitting knives are matching in the sense that each has a cross-shaped (or star-shaped) profile, rather than a hollow profile of the type characterizing coring knives 22 and 24. Pitting knives 72 and 74 in FIGS. 6 and 7 each have four radial blades defining identical cross-shaped profiles, although in variations on the embodiment of FIGS. 6 and 7, they may alternatively have more than four or less than four radial blades.

Each pitting knife 72 is mounted on one of plunger shafts 21, as are coring knives 22 in FIGS. 1–5. Similarly, each pitting knife 74 is mounted on one of plunger shafts 23, as are coring knives 24 in FIGS. 1–5. Each pair of knives 72 and 74 are translated in the same manner and along the same paths as is the pair of knives 22 and 24 which it replaces.

FIG. 6 is a perspective view of pitted olive 10' whose pit 11' has been removed by an embodiment of the invention including opposed pitting knives 72 and 74. In FIG. 6, knives 72 and 74 have already retracted from olive 10' after simultaneously penetrating both ends of the olive. While knife 74 retracted from olive 10', knife 72 continued to advance toward knife 74, thus pushing pit 11' out through olive flaps 10d (shown in phantom view), which flaps 10d temporarily deformed to admit pit 11' and then relaxed back into their original position, defining cross-shaped wound 10f in the surface of olive 10'. Just as knife 74 produced wound 10f, knife 72 produced scar 10e in the opposite end of the olive.

Pitting knives 72 and 74 remove negligible amounts of olive flesh, unlike coring knives 22 and 24 which remove substantial olive flesh (comprising end pieces 12a and 12b) as they pit each olive.

FIG. 7 is a side view of a portion of the pitting knife embodiment, including plunger shaft 21, plate 17, and pocket 16 identical to those shown in FIGS. 1 through 5. In FIG. 7, pitting knife 72 has penetrated the left end of olive 10' and pitting knife 74 has retracted from the right end of olive 10 and through pocket 16. Knife 72 has pressed olive 10' against pocket 16. Knife 72 and knife 24 will continue to advance to the right, in order to push pit 11' of olive 10' (to the right) clear from flaps 10d and away from the remaining portion of olive 10'.

At a stage of the pitting operation immediately preceding that represented by FIG. 7, the olive (shown in phantom view as olive 10") had been impaled between the knives (shown in phantom view as knives 72' and 74') and was held between the knives in a position displaced to the left from plate 17. The knives had simultaneously penetrated the opposite ends of olive 10" to reach opposite ends of pit 11".

The method of the invention includes the steps of: translating a pocket adapted to receive an olive to be processed along a portion of a substantially circular pocket path; translating a first knife and a second, opposed matching knife along a path substantially parallel to the pocket path; while the pocket occupies a first segment of the pocket path, extending the first knife and the second knife into engagement with an olive between the knives; while the pocket and olive occupy a second segment of the pocket path, retracting the second knife while advancing the first knife to extract a pit from the olive; and while the pocket and pitted olive occupy a third segment of the pocket path, retracting the first and second knives away from the pitted olive and pocket. In a first embodiment, the knives are hollow coring knives, which produce a clean and uniform bore through the pitted olive and remove an end piece from each end of the olive. In a second embodiment, the knives are pitting knives, which do not remove significant olive flesh from the opposite ends of the olive during the pitting operation. In performing inventive method, any of the coring and pitting knives described above with reference to the inventive apparatus may be employed.

The foregoing is merely illustrative and explanatory of the inventive method and apparatus. Various changes in the component sizes and shapes, and other details of the embodiments described herein may be within the scope of the appended claims.

What is claimed is:

1. A method for pitting an olive, including the steps of:
   (a) translating a pocket, having a first surface, dimensioned to receive an olive, along a portion of a substantially circular pocket path;
   (b) translating each of a first knife and a second, opposed matching knife along a path substantially parallel to the pocket path;
   (c) while the pocket occupies a first segment of the pocket path, simultaneously advancing the first knife and the second knife so that both knives simultaneously penetrate opposite ends of an olive positioned between the knives, wherein the olive has an axis extending between the opposite ends thereof;
   (d) while the pocket and the olive occupy a second segment so the pocket path, extracting a pit from within the olive by unidirectionally translating the first knife and the second knife in a manner so that the second knife retracts along the axis while the first knife advances along the axis; and
   (e) while the pocket and pitted olive occupy a third segment of the pocket path, retracting the first knife and the second knife away from the pitted olive and the pocket.

2. The method of claim 1, wherein the pocket has an inner surface defining an orifice, step (d) includes the steps of:
   (f) retracting the second knife through the orifice;
   (g) advancing the first knife to push the olive against the first surface; and
   (h) after step (g), continuing to advance the first knife to push the pit out from within the olive and through the orifice.

3. The method of claim 1, wherein both the first knife and the second knife are pitting knives.

4. The method of claim 1, wherein both the first knife and the second knife are coring knives and the first knife includes a spring loaded eject pin, wherein during step (c) the knives define a uniform bore surface within the olive, said bore surface separating the olive into an inner core including the olive pit and an outer olive portion, and wherein during step (d) the eject pin pushes the inner core out from within the olive.

* * * * *